US010833736B2

(12) United States Patent
Hong et al.

(10) Patent No.: US 10,833,736 B2
(45) Date of Patent: Nov. 10, 2020

(54) HYBRID BEAMFORMING METHOD FOR BEAM-BASED COOPERATIVE TRANSMISSION, AND APPARATUS FOR THE SAME

(71) Applicant: ELECTRONICS AND TELECOMMUNICATIONS RESEARCH INSTITUTE, Daejeon (KR)

(72) Inventors: Seung Eun Hong, Daejeon (KR); Min Hyun Kim, Busan (KR); Tae Gyun Noh, Daejeon (KR); In Kyeong Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/691,658

(22) Filed: Nov. 22, 2019

(65) Prior Publication Data

US 2020/0169301 A1 May 28, 2020

(30) Foreign Application Priority Data

Nov. 23, 2018 (KR) .......................... 10-2018-0146597
Nov. 5, 2019 (KR) .......................... 10-2019-0140051

(51) Int. Cl.
*H04L 1/02* (2006.01)
*H04B 7/024* (2017.01)
(Continued)

(52) U.S. Cl.
CPC ........... *H04B 7/024* (2013.01); *H04B 7/0617* (2013.01); *H04B 7/0626* (2013.01);
(Continued)

(58) Field of Classification Search
CPC ......... H04L 1/0618; H04L 1/06; H04L 27/38; H04L 5/0007; H04W 80/04; H04W 88/06; H04W 28/04
(Continued)

(56) References Cited

U.S. PATENT DOCUMENTS 9,800,304 B2 10/2017 Kim et al.
9,998,190 B2* 6/2018 Ayoughi ............... H04W 16/28
(Continued)

FOREIGN PATENT DOCUMENTS

KR 10-2018-0042773 A 4/2018

OTHER PUBLICATIONS

K. Satyanarayana et al., "Adaptive Transceiver Design for C-RAN in mmWave Communications", IEEE Access, vol. 6, pp. 16770-16782, Nov. 20, 2017.

*Primary Examiner* — Khai Tran
(74) *Attorney, Agent, or Firm* — Rabin & Berdo, P.C.

(57) ABSTRACT

A hybrid beamforming based cooperative transmission system may comprise comprising a centralized processor (CP), access nodes (ANs) connected to the CP, and fronthaul links connecting the CP to the ANs. The CP may provide an outer precoding matrix for a first AN of the ANs, which is derived from global statistical channel state information (CSI) generated from local statistical CSI collected from the ANs, to the first AN via the fronthaul link; and the first AN may configure a radio frequency (RF) precoder of the first AN based on the outer precoding matrix, and configure a digital precoder of the first AN based on local instantaneous effective CSI between the first AN and first terminals to be served by the first AN.

17 Claims, 10 Drawing Sheets

(51) Int. Cl.
  *H04B 7/06* (2006.01)
  *H04W 74/08* (2009.01)
  *H04L 5/00* (2006.01)

(52) U.S. Cl.
  CPC .......... *H04L 5/0035* (2013.01); *H04L 5/0051* (2013.01); *H04W 74/0833* (2013.01)

(58) Field of Classification Search
  USPC .......................... 375/267, 260; 370/328, 329
  See application file for complete search history.

(56) References Cited

U.S. PATENT DOCUMENTS

| | | | |
|---|---|---|---|
| 2010/0273514 A1* | 10/2010 | Koo ..................... | H04B 7/024 |
| | | | 455/501 |
| 2014/0044044 A1* | 2/2014 | Josiam .................. | H04B 7/063 |
| | | | 370/328 |
| 2015/0103934 A1 | 4/2015 | Nam et al. | |
| 2016/0344519 A1 | 11/2016 | Lin et al. | |
| 2017/0208613 A1* | 7/2017 | Nam ..................... | H04B 7/0478 |
| 2017/0251480 A1* | 8/2017 | Liang ................... | H04W 72/08 |
| 2018/0375557 A1 | 12/2018 | Noh et al. | |
| 2019/0075554 A1* | 3/2019 | Nilsson ................. | H04B 7/088 |
| 2019/0260459 A1 | 8/2019 | Jeon et al. | |

\* cited by examiner

HYBRID BEAMFORMING METHOD FOR BEAM-BASED COOPERATIVE TRANSMISSION, AND APPARATUS FOR THE SAME

CROSS-REFERENCE TO RELATED APPLICATIONS

This application claims priority to Korean Patent Applications No. 10-2018-0146597 filed on Nov. 23, 2018 and No. 10-2019-0140051 filed on Nov. 5, 2019 in the Korean Intellectual Property Office (KIPO), the entire contents of which are hereby incorporated by reference.

BACKGROUND

1. Technical Field

The present disclosure relates to beam-based cooperative transmission in a mobile communication system, and more particularly, to a hierarchical hybrid beamforming method for interference management and cooperative transmission, in a mobile communication network in which base stations using high frequency bands requiring beamforming for increase of traffic capacity are deployed densely, and an apparatus for the same.

2. Related Art

The need to use high-frequency (e.g., millimeter-wave, terahertz) bands with wider bandwidths to accommodate the explosion of mobile traffic in mobile networks is increasing. The high frequency band has a problem in that a received signal-to-noise ratio (SNR) is degraded due to a high propagation loss (e.g., path loss, object penetration loss, etc.), and thus it is essential to apply a beamforming technique for focusing and transmitting a signal in a specific direction.

Analog beamforming steers a signal only with phase shifters, so that a separate radio frequency (RF) chain is not required for each antenna element, thereby enabling cost-effective implementation. However, the analog beamforming has the disadvantage of inaccurate angular resolution. On the other hand, digital beamforming can have a high accuracy because the direction of beam is controlled by adjusting a phase and an amplitude of the signal in a digital manner. However, since an RF chain including analog-to-digital converter (ADC) and digital-to-analog converter (DAC) is required for each antenna, in case of using a large-scale array antenna, it has a difficulty in the implementation due to increased hardware complexity and power consumption.

Therefore, in order to reduce the complexity of the digital beamforming and increase the accuracy of the analog beamforming, a hybrid beamforming technique using the analog beamforming in the RF domain and the digital beamforming in the baseband is essential.

SUMMARY

Accordingly, exemplary embodiments of the present disclosure provide an operation method of a centralized processor (CP) for hierarchical hybrid beamforming based cooperative transmission. Accordingly, exemplary embodiments of the present disclosure also provide an operation method of an access node (AN) for hierarchical hybrid beamforming based cooperative transmission. Accordingly, exemplary embodiments of the present disclosure also provide a system for hierarchical hybrid beamforming based cooperative transmission.

According to exemplary embodiments of the present disclosure, an operation method of a centralized processor (CP) for hybrid beamforming based cooperative transmission may comprise generating global statistical channel state information (CSI) by collecting local statistical CSI from each of access nodes (ANs) connected to the CP; configuring a set of first terminals to be served by a first AN of the ANs based on the global statistical CSI; configuring a transmission signal space and an interference signal space for the first AN, and deriving an outer precoding matrix defining an interference-controlled transmission signal space for the first AN based on the transmission signal space and the interference signal space; and transmitting the derived outer precoding matrix to the first AN.

The local statistical CSI may be a spatial channel covariance matrix between each of the ANs and terminals.

The CP may provide configuration information on a synchronized random access channel (RACH) interval through the ANs; and the first terminal may transmit a RACH signal to the first AN through the RACH interval, and may be allocated an uplink pilot from the first AN.

The local statistical CSI between the first terminal and the first AN may be measured based on the uplink pilot.

A radio frequency (RF) precoder of the first AN may be configured based on the derived outer precoding matrix, and a digital precoder of the first AN may be configured using local instantaneous effective CSI between the first AN and the first terminals.

The operation method may further comprise performing performance monitoring; adjusting a size of the interference-controlled transmission signal space for the first AN according to a result of the performance monitoring; and transmitting the outer precoding matrix modified according to the adjusted size of the interference-controlled transmission signal space to the first AN.

The operation method may further comprise transferring data to the first AN, wherein the data is transmitted to the first terminals through cooperative transmission of the first AN with at least one AN except the first AN among the ANs.

Furthermore, according to exemplary embodiments of the present disclosure, an operation method of a first access node (AN) for hybrid beamforming based cooperative transmission may comprise measuring local statistical channel state information (CSI) for neighboring terminals and reporting the measured local statistical CSI to a centralized processor (CP); receiving, from the CP, an outer precoding matrix derived from global statistical CSI generated from the local statistical CSI and information on a set of first terminals to be served by the first AN; and configuring a radio frequency (RF) precoder of the first AN based on the outer precoding matrix.

The local statistical CSI may be a spatial channel covariance matrix between the first AN and the neighboring terminals.

The local statistical CSI may be reported periodically or when the local statistical CSI is changed.

The neighboring terminals for which the local statistical CSI is measured may be limited to terminals transmitting signals which are received at the first AN with a strength greater than a predetermined value.

When the RF precoder includes only phase shifters, a size of each element of the outer precoding matrix may be set constant, and a phase of each of the phase shifters may be set to be a phase of each element of the outer precoding matrix.

The operation method may further comprise providing configuration information on a synchronized random access channel (RACH) interval provided from the CP to the neighboring terminals, wherein the neighboring terminals transmit RACH signals to the first AN through the RACH interval and are allocated uplink pilots from the first AN.

The local statistical CSI between the neighboring terminals and the first AN may be measured based on the uplink pilots.

A digital precoder of the first AN may be configured using local instantaneous effective CSI between the first AN and the first terminals.

The operation method may further comprise receiving data from the CP, wherein the data is transmitted to the first terminals through cooperative transmission of the first AN and a second AN.

Furthermore, according to exemplary embodiments of the present disclosure, a hybrid beamforming based cooperative transmission system may comprise a centralized processor (CP), access nodes (ANs) connected to the CP, and fronthaul links connecting the CP to the ANs, wherein the CP provides an outer precoding matrix for a first AN of the ANs, which is derived from global statistical channel state information (CSI) generated from local statistical CSI collected from the ANs, to the first AN via the fronthaul link; and the first AN configures a radio frequency (RF) precoder of the first AN based on the outer precoding matrix, and configures a digital precoder of the first AN based on local instantaneous effective CSI between the first AN and first terminals to be served by the first AN.

The local statistical CSI may be a spatial channel covariance matrix between each of the ANs and terminals.

The CP and the ANs may be nodes into which base station functions are split at a physical (PHY) layer or at a layer higher than the PHY layer.

The first AN may convert data transferred from the CP into a precoded signal using the RF precoder and the digital precoder of the first AN, and transmit the precoded signal to the first terminals through cooperative transmission with at least one other AN except the first AN of the ANs.

According to the exemplary embodiments of the present disclosure, through the functional-split at the PHY layer, it is made possible to connect the distributed ANs and the CP with a relatively low fronthaul capacity, as compared to the functional-slit at a lower level (RF level or Low-PHY). Thus, a C-RAN system including highly dense distributed ANs can be implemented cost-effectively. In the exemplary embodiments of the present disclosure, the CP can calculate global statistical CSI by collecting local statistical CSI reported by the distributed ANs, and allocate an interference-controlled transmission space for each AN derived based on the global statistical CSI. On the other hand, each of the distributed ANs can control the interference between terminals that it serves by performing fine hybrid beamforming again within each interference-controlled transmission space defined by the CP. Therefore, according to the exemplary embodiments of the present disclosure, overhead required for cooperative transmission can be minimized through user-centric beam management and clustering, and a construction cost reduction effect and a traffic capacity increase effect of the mobile communication network can be obtained.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
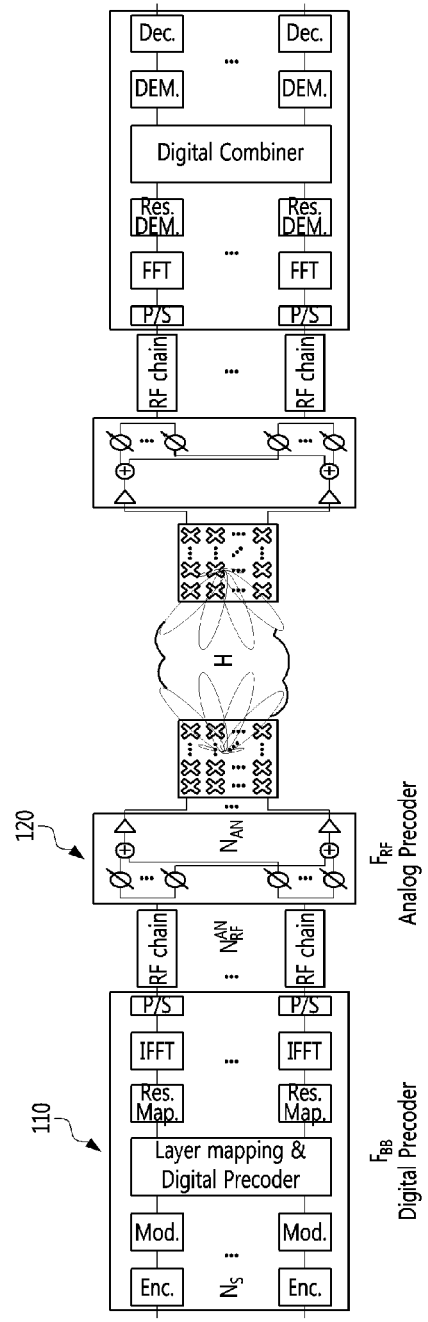
FIG. 1 is a conceptual diagram illustrating a structure of a transmitter and a receiver to which hybrid beamforming is applied.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a structure of a transmitter and a receiver to which hybrid beamforming is applied.

As shown in FIG. 1, digital beamforming may be performed by changing a phase and an amplitude of a baseband signal by a digital precoder 110 belonging to a baseband part of the transmitter. On the other hand, analog beamforming may be performed by changing a phase of a radio frequency (RF) signal obtained through RF conversion on the signal output from the baseband part using phase shifters of an analog precoder 120.

That is, as mentioned above, the analog beamforming is used in the RF domain and the digital beamforming is used in the baseband to reduce complexity of the digital beamforming and increase accuracy of the analog beamforming.

In this reason, hybrid beamforming technology using both of the two beamforming schemes is essential. Meanwhile, hereinafter, the analog precoder may also be referred to as an RF precoder.

Figure 2:
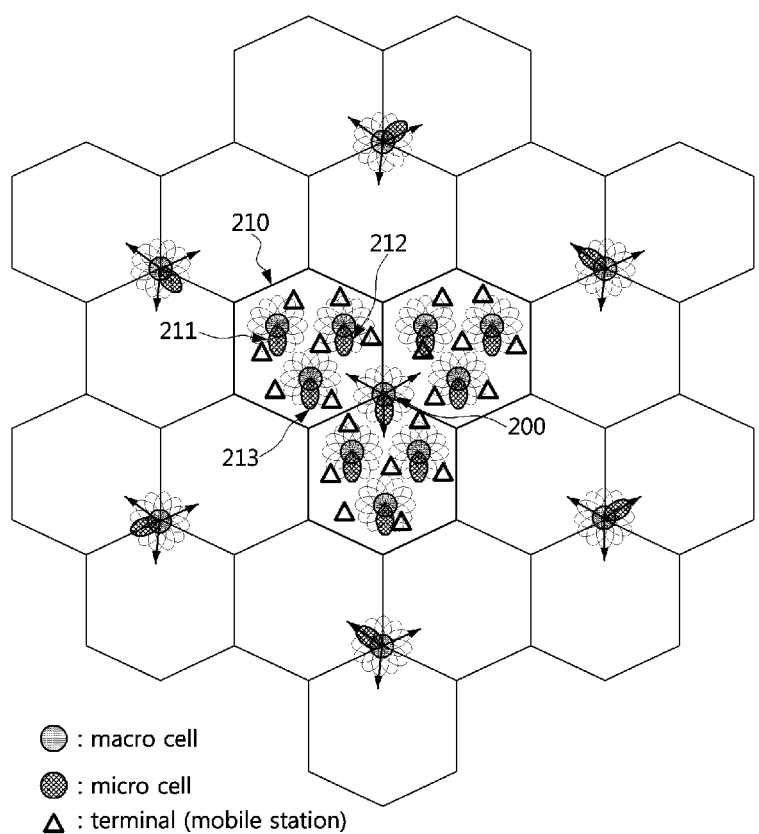
FIG. 2 is a conceptual diagram illustrating a cell deployment of a 5G new radio (NR) based system in a highly dense urban environment.

FIG. 2 is a conceptual diagram illustrating a cell deployment of a 5G new radio (NR) based system in a highly dense urban environment.

FIG. 2 illustrates a 5G NR system based cell deployment in a dense urban environment under consideration for 5G system evaluation in ITU and 3GPP. Referring to FIG. 2, three micro base stations 211, 212, and 213 may be disposed in one macro sector cell 210 operated by a macro base station 200 to operate three micro cells. In addition, a plurality of terminals (i.e., mobile stations) may be located in each cell.

Both of the macro base station and the micro base stations may use millimeter waves to accommodate exploding mobile traffic. In the 3GPP 5G NR based system, base station-centric beam management is performed. Considering that one base station accommodates multiple terminals, the base station-centric beam management may be appropriate. However, in an ultra-dense network (UDN), where the number of distributed base stations may be larger than the number of terminals, user-centric beam management may be more efficient.

Figure 3:
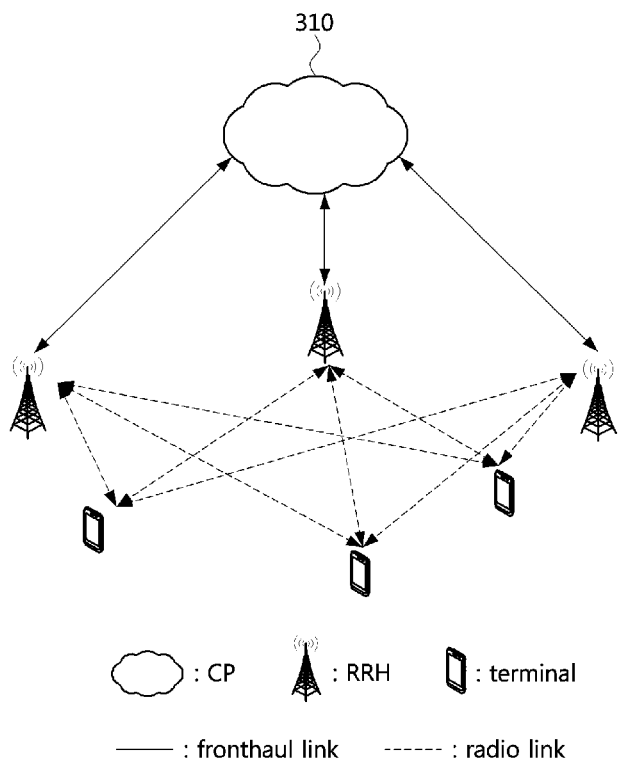
FIG. 3 is a conceptual diagram for explaining an architecture of a cloud radio access network (C-RAN)

FIG. 3 is a conceptual diagram for explaining an architecture of a cloud radio access network (C-RAN).

In the C-RAN architecture shown in FIG. 3, baseband processing performed locally at conventional base stations may be aggregated into and performed centrally by one cloud computing center.

Unlike the conventional base stations, in the C-RAN architecture, a remote radio head (RRH) may have only RF and antenna functions. Each RRH and a cloud 310 may be connected by a fronthaul link. The fronthaul link should have a low signal propagation delay and be able to smoothly transmit a large amount of signals. In general, it is known that the fronthaul link requires capacity up to 20 times a transmission speed of a radio link. Meanwhile, as the 5G mobile communication system is introduced, the transmission speed of the radio section is increased to 20 Gbps, and the required fronthaul capacity is not practically provided in terms of cost, or the like. In order to reduce the required fronthaul capacity, functional-splits are being studied that move some of the baseband functionality back to the RRH sites. Although the functional-split can reduce the capacity of the fronthaul links, there are aspects of redistributing functions of the centralized signal processing, and thus it is needed to investigate a point where the functions are split and select the point appropriately.

In order to solve the above-described problems of the prior art, exemplary embodiments of the present disclosure enable the maximum utilization of centralized signal and resource processing while limiting the use of fronthaul in the C-RAN architecture using the high frequency and functional-split. Accordingly, exemplary embodiments of the present disclosure have an object to provide an apparatus and a method for providing a high capacity service to a user terminal through cooperative transmission in which dense access nodes (ANs) participate.

In the centralized or C-RAN architecture, a remote radio unit (RRU) may perform RF-to-baseband conversion at a location proximate to antennas, and a centralized baseband unit (BBU) may perform baseband (i.e., PHY, MAC, and a higher layer of a radio protocol stack) processing. Such an architecture can reduce a total cost of ownership (TCO) by pooling baseband resources of the BBU while improving network capacity and applying advanced radio coordination functions to improve user experiences. In this case, the connection between the RRU and the centralized BBU is referred to as the 'fronthaul' as compared to a 'backhaul' from the BBU to a core network. In the current C-RAN architecture, digitized time-domain sample signals of each antenna device are transmitted over the fronthaul link between the RRU and the BBU, so that the capacity of the fronthaul increases in proportion to the number of antennas. In the advanced 5G networks and next-generation networks, large-scale MIMO and UDN technologies will be more widely used as key wireless features that significantly improve spectral efficiency and network capacity. Thus, it is important to reduce fronthaul network costs and increase system scalability for antennas and wireless edge nodes.

To address this, various functional-split options for the radio protocol stack are being discussed. The functional-split may determine how many base station functions will be located close to the user geographically, and how many functions will be centralized for achieving more processing gains, while mitigating the fronthaul network capacity and delay requirements. Exemplary embodiments of the present disclosure deal with 'intra-PHY functional split (iPFS)' to reduce the fronthaul load while maintaining cooperative transmission functions of the dense C-RAN.

According to the functional split, one base station may be split into at least one 'access node (AN)' and at least one 'base node (BN)'. The ANs may be distributed close to the terminals (i.e., mobile station (MS)), and the BNs may be centralized and configured as a pool at one site, which may be referred to as a 'centralized processor (CP)'.

Figure 4:
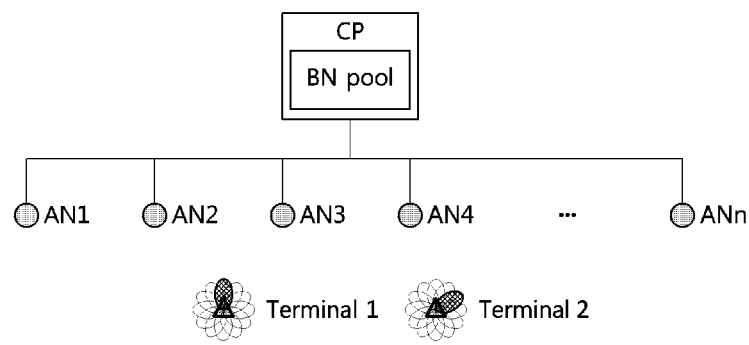
FIG. 4 is a conceptual diagram illustrating a concept of user-centric clustering in a dense C-RAN to which exemplary embodiments of the present disclosure are applied.

FIG. 4 is a conceptual diagram illustrating a concept of user-centric clustering in a dense C-RAN to which exemplary embodiments of the present disclosure are applied.

As shown in FIG. 4, there is shown a C-RAN system in which distributed n (>>2) ANs (e.g., AN1, AN2, AN3, . . . ANn) are connected to a CP via wired capacity-limited fronthaul links. In FIG. 4A, for convenience of description, a case where the C-RAN system provides services to two terminals is illustrated. In this case, cooperative transmission involving the distributed ANs may be facilitated while minimizing beam control overhead and use of fronthaul through user-centric beam management.

Figure 5:
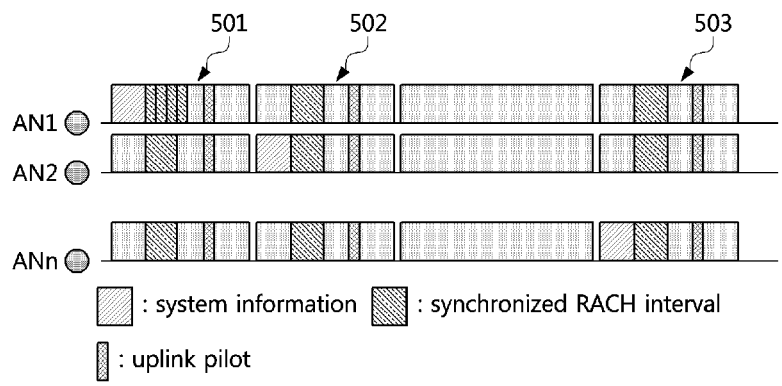
FIG. 5 is a conceptual diagram illustrating a concept of user-centric beam management in a dense C-RAN to which exemplary embodiments of the present disclosure are applied.

FIG. 5 is a conceptual diagram illustrating a concept of user-centric beam management in a dense C-RAN to which exemplary embodiments of the present disclosure are applied.

Referring to FIG. 4 and FIG. 5, the operations of nodes through the user-centric beam management may be performed by synchronized RACH resource allocation and signaling through system information broadcasting by the ANs, beam sweeping of the terminal in a synchronized RACH interval, user-centric clustering, training and channel information acquisition using uplink (UL) pilots, and downlink (DL) cooperative transmission.

The CP may broadcast system information. Here, the system information may include parameters required for system operations defined in standards such as LTE, LTE-A, and 5G NR. In detail, the system information may include downlink/uplink configuration information, detailed parameter information related to random access, and the like. The terminals may perform a cell-free ultra-dense cloud RAN operation after acquiring such the information. In addition, the CP may provide physical synchronization signals for acquiring frame synchronization between the distributed ANs and the terminals through the ANs. In broadcasting the system information, the CP should secure coverage and minimize overhead of the broadcasting. To ensure coverage of the millimeter wave frequency signal, the CP may transmit the system information while sweeping directional beams through the AN.

Referring to FIG. 5, the CP may control the distributed ANs (e.g., AN1, AN2, AN3, . . . , ANn) to sequentially transmit system information to reduce the overhead of the system information broadcasting. For example, the AN1 may be controlled to transmit system information in a frame #1 501, the AN2 may be controlled to transmit system information in a frame #2 502, and the ANn may be controlled to transmit system information in a frame # n 503.

Here, the overhead of system information broadcasting may include time, frequency, and power resources used for transmitting the system information. Here, the overhead of system information broadcasting and a time required for the terminal to acquire the system information are in a trade-off relationship. That is, if each AN broadcasts the system information individually every frame, the overhead may be increased, but the terminal can obtain the system information quickly. On the other hand, the system information may be transmitted through a macro base station using a centimeter wave (cmWave) frequency band having wide coverage.

Meanwhile, the CP may provide synchronized RACH intervals to the distributed ANs. By allocating the synchronized RACH intervals to the distributed ANs, interference between the ANs caused by the overlap of the RACH interval and a data transmission interval may be eliminated. A detailed operation thereof will be described later as a random access operation of the terminals. As an example of allocating the synchronized RACH interval, as shown in FIG. 5, the CP may provide the ANs with the synchronized RACH interval every frame. Meanwhile, each synchronized RACH interval may include at least one RACH slot. The CP may allocate at least one RACH slot in various schemes within the synchronized RACH interval.

Figure 6:
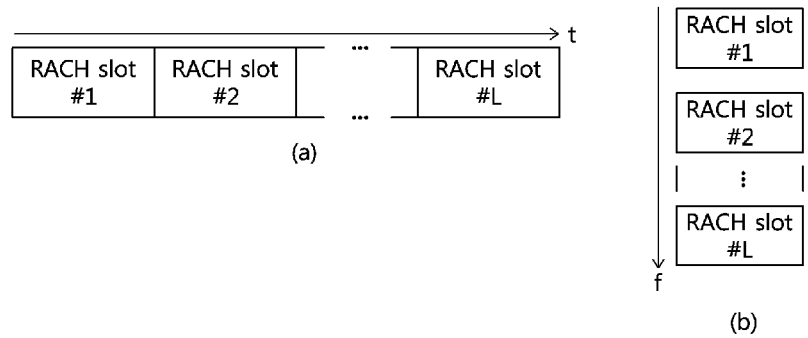
FIG. 6 is a conceptual diagram illustrating an allocation scheme of RACH slots within a synchronized RACH interval.

FIG. 6 is a conceptual diagram illustrating an allocation scheme of RACH slots within a synchronized RACH interval.

As shown in FIG. 6, RACH slots may be arranged in the time axis (i.e., case (a)) or in the frequency axis (i.e., case (b)) within a synchronized RACH interval. FIG. 6 shows examples in which a total of L RACH slots are arranged in one synchronized RACH interval.

Meanwhile, the RACH slot may mean a time unit in which a corresponding terminal may complete a beam sweeping operation. For example, in case that the terminal supports a beam sweeping operation for M beams, the beam sweeping operation from a beam #1 to a beam #M may be completed within one RACH slot.

Figure 7:
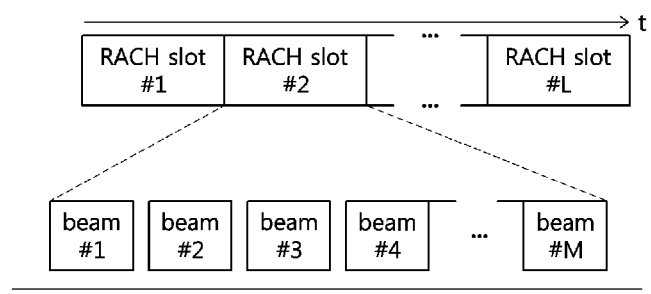
FIG. 7 is a conceptual diagram for explaining a beam sweeping operation within a RACH slot.

FIG. 7 is a conceptual diagram for explaining a beam sweeping operation within a RACH slot.

As shown in FIG. 7, when it is assumed that the maximum number of beams used for beam-sweeping of the terminal is M, the terminal may sequentially transmit a total of M beams within one RACH slot. The number of beams used for beam sweeping may vary from terminal to terminal.

In another exemplary embodiment, instead of defining the RACH slots within the RACH interval, the RACH interval may be configured to have a plurality of mini-slots. That is, in the above-described exemplary embodiments, the RACH slot is defined as a time unit in which the terminal can complete the beam-sweeping operation, but a time unit in which the terminal can transmit one beam may be defined as a mini-slot (i.e., RACH mini-slot).

Figure 8:
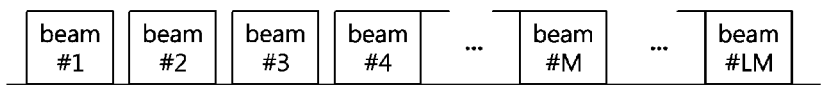
FIG. 8 is a conceptual diagram illustrating an allocation scheme of RACH mini-slots within a synchronized RACH interval.

FIG. 8 is a conceptual diagram illustrating an allocation scheme of RACH mini-slots within a synchronized RACH interval.

Referring to FIG. 8, the synchronized RACH interval may be composed of L×M RACH mini-slots without dividing the RACH interval into RACH slots.

As in the case of the above-described system information broadcasting, there may be a trade-off relationship between the number of configured RACH intervals and a network entry time of the terminal. For example, the spacing of the RACH intervals may be increased to reduce the overhead of the RACH intervals. For example, in FIG. 5, the RACH interval exists for each frame, but the RACH interval may exist for two or more frames. On the other hand, two or more RACH intervals may exist in one frame to reduce the network entry time of the terminal.

Meanwhile, when distributed terminals perform random accesses in one RACH interval, collisions may occur between them. Thus, it may be required for the CP and the ANs to provide a mechanism minimizing the collisions of random accesses by the terminals.

User-Centric Beam Management Procedure

Hereinafter, a user centered beam management procedure (i.e., terminal-centric beam management procedure) according to an exemplary embodiment of the present disclosure will be described.

Figure 9:
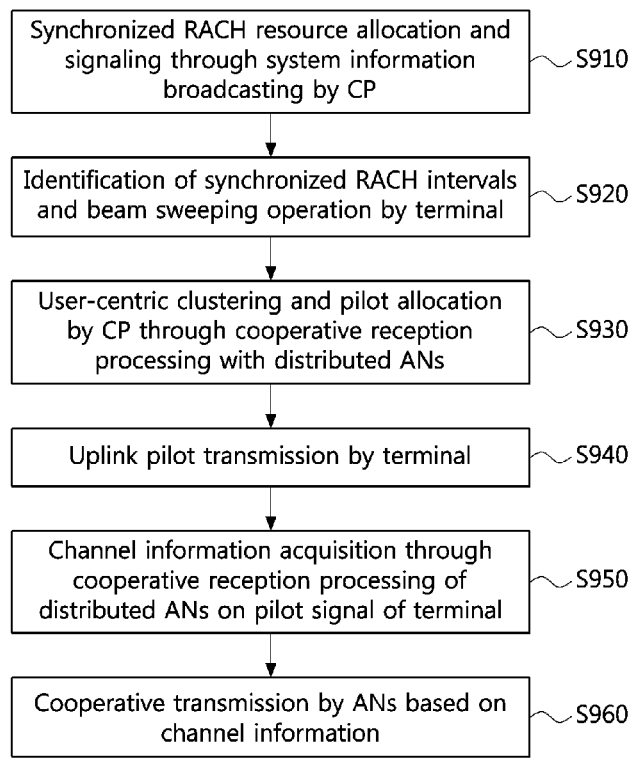
FIG. 9 is a conceptual diagram for explaining a user-centric beam management procedure according to an exemplary embodiment of the present disclosure.

FIG. 9 is a conceptual diagram for explaining a user-centric beam management procedure according to an exemplary embodiment of the present disclosure.

In a step S910, the CP may configure synchronized RACH resources (i.e., RACH intervals (and RACH slots)) and transmit system information including information on the configured RACH resources to the terminals through the ANs. The terminals may receive the system information broadcasted by the CP through the ANs and identify the information on the configured RACH intervals.

In a step S920, the terminal may perform beam sweeping based on the information on the configured RACH intervals. In this case, as described in FIG. 6, when a plurality of RACH slots are given within the RACH interval, the terminal may select one RACH slot. By selecting a RACH slot to be used by the terminal, random access collisions between the terminals may be resolved in time or frequency. Meanwhile, assuming beam-based access, spatial separation may be possible even when two or more terminals perform the random accesses by selecting the same RACH slot. Alternatively, code division may be also possible in which different terminals use orthogonal RACH codes as in the LTE/NR system. When the RACH interval is composed of mini-slots without division into RACH slots as illustrated in FIG. 8, the terminal may virtually configure a RACH slot with M mini-slots according to the number M of beams used for its beam-sweeping, and perform the beam-sweeping operation by using the virtually-configured RACH slot.

In a step S930, the CP may select candidate terminals to be served by each AN based on strengths of the signals received in the RACH interval through cooperation with the distributed ANs. Through the cooperation of the CP and the ANs, the reception strengths (e.g., received signal strength indicator (RSSI), etc.) of the RACH signals received at each AN may be measured, and the transmitters of the RACH signals may be sorted in the order of the reception strengths. For example, RACH signal transmitters up to the N-th reception strength may be sorted for each AN. In this case, information on the best beam of the corresponding RACH signal transmitter may also be recorded. The CP and the ANs may collaborate to allocate uplink pilots that can be distinguished from each other to the RACH signal transmitters (i.e., terminals). The CP may generate a list of target terminals to which each AN will provide services, and generate a list of ANs that can provide services to a specific terminal (i.e., clustering information) based on the lists of target terminals. That is, a cluster of ANs providing services for each terminal may be configured. Meanwhile, clustering by the uplink pilots, which will be described later, may be referred to as 'fine clustering', and the RACH-based clustering performed in the step S930 may be referred to as 'coarse clustering'. The clustering information described above may include information on the best beam received by each AN, and information on the uplink pilots allocated to the terminals (e.g., information on pilot sequences and resources to be used for pilot transmission). The CP may transmit the clustering information to the terminals through the ANs. On the basis of the clustering information received through the CP and the AN, the terminal may identify information on the cluster of ANs that will provide services to the terminal, information on the best beam received by each AN, and the uplink pilot allocated to the terminal. Accordingly, the terminal may periodically transmit the allocated uplink pilot through beams that can be simultaneously formed by the terminal.

In a step S940, ANs belonging to the cluster for the terminal may perform cooperative reception for the uplink pilot transmitted by the terminal, and may acquire channel information between the terminal and the ANs based on the received uplink pilot. Finally, in a step S950, the ANs belonging to the cluster for the terminal may perform cooperative transmission for the terminal based on the obtained channel information.

The cell-free dense cloud-based RAN facilitates centralized resource and interference management by the CP, but the limitation of the fronthaul connecting the distributed ANs to the CP should be considered. In particular, when densely-distributed ANs are connected to the CP, the fronthaul cost and power consumption may increase by the number of ANs. In order to enable smooth cooperative transmission between the distributed ANs and minimize the required fronthaul capacity, the present disclosure considers the functional-split at the PHY layer. The functional-split at the PHY layer may be classified into two types.

In the first type of PHY layer functional-split, a digital beamforming function (e.g., digital precoder) may be disposed in the CP. In this case, in order to obtain instantaneous CSI for the digital precoder, since the instantaneous CSI measured using the uplink pilot should be delivered to the CP, considerable load may be generated in the fronthaul. However, the instantaneous CSI can be used to minimize interferences between the ANs.

In the second type of PHY layer functional-split, the digital precoder and a modulation block may be disposed in the local AN, and only higher PHY functions may be disposed in the CP. In this case, the instantaneous CSI for the digital precoder is only required at the local AN, and does not need to be delivered to the CP via the fronthaul. However, functionality to perform interference control between the ANs may be additionally required in the CP.

Meanwhile, the carrier frequency of the radio section is a millimeter wave band that can provide a large capacity service by securing a bandwidth of 1 GHz or more. The millimeter wave system is a directional beam based system. As described above, cost effective hybrid beamforming techniques are essential in the millimeter wave systems. In the directional beam based system, interferences can be limited when accurate beamforming is performed.

Accordingly, exemplary embodiments of the present disclosure provide methods and apparatuses for providing services to terminals through cooperative transmission of ANs in the cell-free dense cloud-based RAN reflecting the second type of PHY layer functional-split. The exemplary embodiments of the present disclosure are based on hierarchical hybrid beamforming. Since the exemplary embodiments of the present disclosure perform the hybrid beamforming in a distributed AN, the exemplary embodiments of the present disclosure may also be applied to cooperative transmission in a cloud-based RAN in which the functional-split is reflected at a layer higher than the PHY layer.

Hierarchical Hybrid Beamforming-Based Cooperative Transmission System

Figure 10:
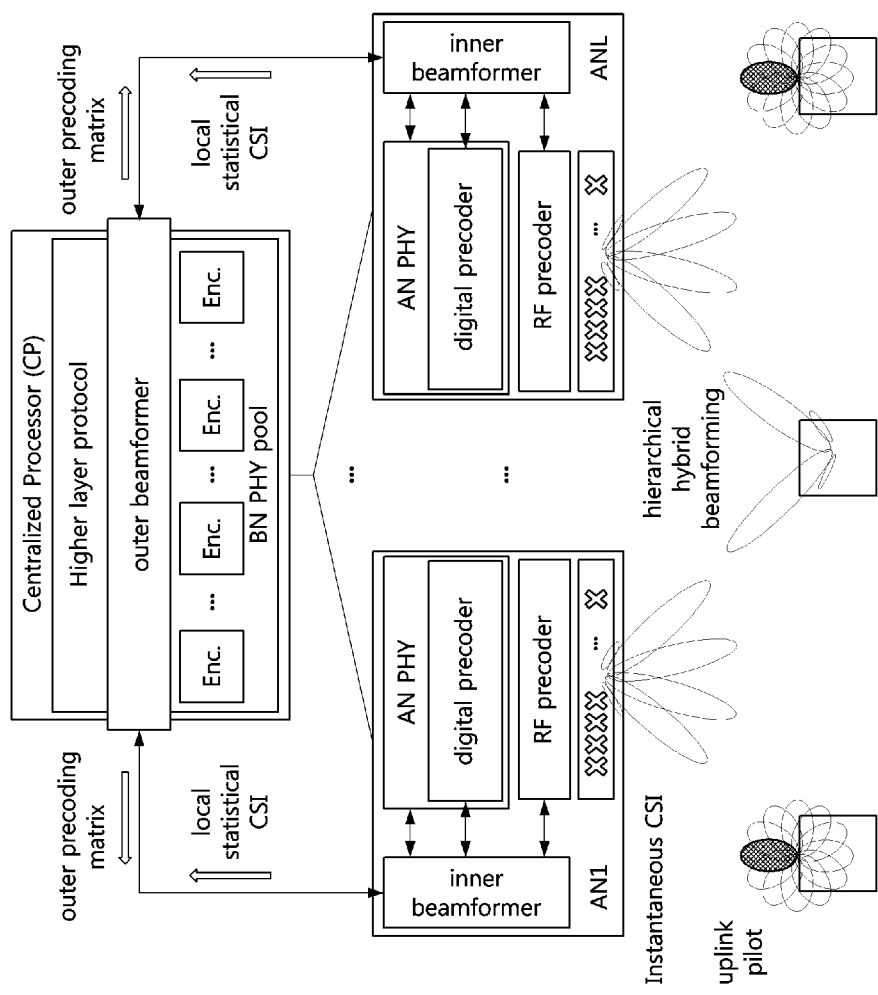
FIG. 10 is a block diagram illustrating a hierarchical hybrid beamforming based cooperative transmission system according to an exemplary embodiment of the present disclosure.

FIG. 10 is a block diagram illustrating a hierarchical hybrid beamforming based cooperative transmission system according to an exemplary embodiment of the present disclosure.

Referring to FIG. 10, as described above, functions of one base station may be split into ANs and BNs. Each of the distributed ANs may be equipped with a large-scale array antenna, and have a smaller number of RF chains than the number of antenna elements of the array antenna. Analog beams may be formed through an RF precoder composed of phase shifters that adjust phases of signals transmitted to multiple antenna elements connected to each RF chain. In addition, each AN may include a digital precoder for controlling interference between the beams by using the formed analog beams. The remaining higher PHY functions, MAC layer functions, and higher layer functions of a radio protocol stack except the lower PHY functions of the AN are performed in the BN, and these BNs may be centralized and configured as a BN pool. This BN pool may be referred to as the 'centralized processor (CP)'. The distributed ANs and the centralized BNs may be connected through the fronthaul. Compared to the case of using the existing RRH functionally-split at the RF level, the PHY layer functional-split considered in the exemplary embodiments of the present disclosure require only a relatively small fronthaul transmission capacity. Thus, it is not necessary to compress the fronthaul signals, or it is possible to perform the fronthaul transmission with only light compression.

For a detailed description of exemplary embodiments of the present disclosure, it is assumed that the number of antennas of AN $1$ (i.e., $l \in \{1, 2, \ldots, L\}$) is $N_l$, and the number of RF chains is assumed to be $O_l$ ($<N_l$). The number of terminals serviced at the same time is denoted by K and is assumed to be $K \leq \Sigma_{l=1}^{L} O_l$. In addition, the number of reception beams that can be formed simultaneously by the terminal k is represented by $O_k > 1$, and $O_k$ may be understood as the maximum number of ANs that can simultaneously provide the services to the terminal k. If the terminal k uses one omni reception beam or quasi-omni reception beam with a large beam width, a specific value $O_k > 1$ may be assumed for this case in order to limit the maximum number of ANs serving terminal k at the same time.

An object of the present disclosure is to provide services to the terminals through the cooperative transmission, which minimizes the interference between the ANs distributed in a dense form while using less fronthaul. The fronthaul may be used for sharing channel state information and data to be transmitted between the distributed ANs and the CP. In order to minimize interference between the distributed ANs, global perfect CSI should be acquired by sharing CSIs (i.e., local CSIs) measured by individual ANs with other ANs. That is, in order to secure the perfect global CSI, local CSIs should be frequently shared through the fronthaul. In addition, for smooth cooperative transmission in which the distributed ANs participate, data to be transmitted to the terminal should be shared with more ANs, and more fronthaul consumption may be generated for this purpose.

In order to solve the above-described problem of CSI sharing, the distributed ANs according to an exemplary embodiment of the present disclosure may measure and estimate local statistical CSI and notify them to the CP. Such the statistical CSI may be long-term channel statistics such as a spatial channel covariance matrix (i.e., $R_{k,l} = \mathbb{E}[h_{k,l} h^*_{k,l}]$, $\forall k \in \{1, 2, \ldots, K\}$) of a specific AN (e.g., AN $1$) and all terminals. Thus, the statistical CSI may be easier to estimate because it varies over a longer time scale than an instantaneous channel. In addition, because the statistical CSI is uniform across all subcarriers, it may be used to design a single analog precoder for all the subcarriers.

In the exemplary embodiments of the present disclosure, it is assumed that each AN is able to measure and estimate the spatial channel covariance matrix. The AN $1$ ($\forall l \in \{1, 2, \ldots, L\}$) may minimize the fronthaul consumption used for CSI sharing by notifying the CP of the statistical CSI (i.e., $R_{k,l}$, $\forall k$) periodically or whenever the statistical CSI changes. In addition, by limiting a range of terminals that are subject to measurement of the statistical CSI by the AN, the statistical CSI may be measured and notified only for the limited range of terminals instead of all terminals, and the fronthaul consumption can be further reduced. To this end, the information described in the step S930 of FIG. 9 may be utilized.

Operation Method of Centralized Processor (CP)

Figure 11:
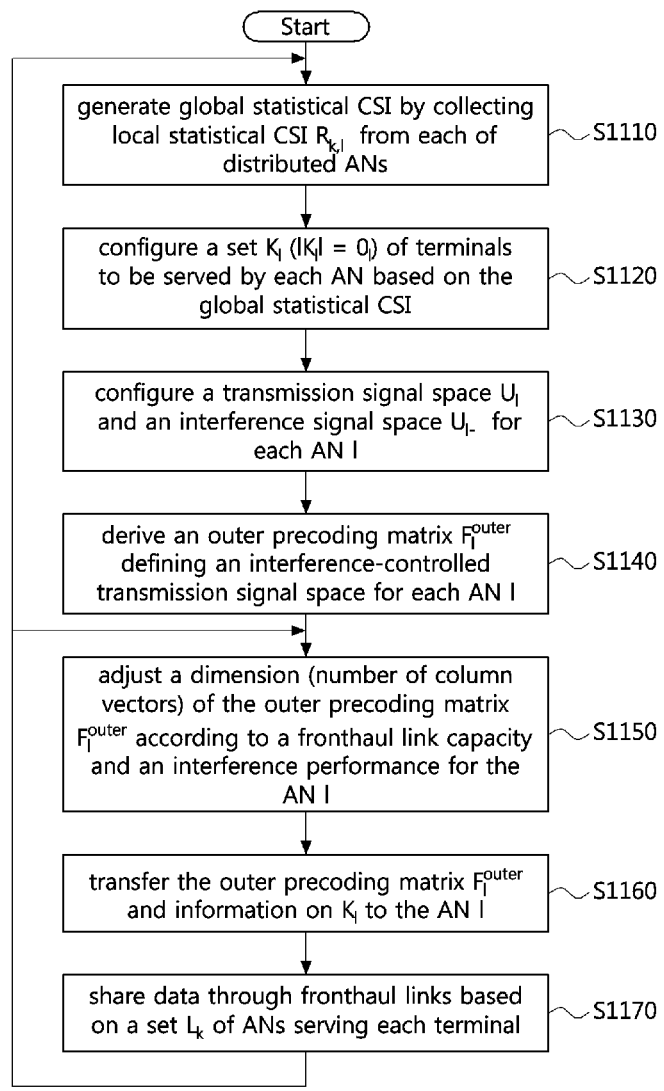
FIG. 11 is a flowchart illustrating an operation of a CP belonging to a hierarchical hybrid beamforming based cooperative transmission system according to an exemplary embodiment of the present disclosure.

FIG. 11 is a flowchart illustrating an operation of a CP belonging to a hierarchical hybrid beamforming based cooperative transmission system according to an exemplary embodiment of the present disclosure.

As described in FIG. 9, the CP, as a central controller of the cloud RAN, may have information about the number of RF chains that determine the number of terminals to which each distributed AN can provide services at the same time, and information about the maximum number of beams which each terminal can simultaneously receive. In the following, an operation procedure of the CP in a state in which the above-described information is already secured will be described.

Referring to FIG. 11, the CP may generate global statistical CSI by collecting local statistical CSIs ($R_{k,l}$) notified from each of the ANs (S1110). The CP may sort the statistical CSIs ($\text{Tr}(R_{k,l})$, $\forall k$) for the respective terminals of the AN $1$ ($\forall l \in \{1, 2, \ldots, L\}$) in descending order, and configure a set $\mathcal{K}_l$ by selecting terminals having the highest $\text{Tr}(R_{k,l})$ as many as the number $O_l$ of the RF chains that the corresponding AN provides (S1120). In addition, the CP may configure a set $\mathcal{L}_k$ of ANs that provide services to the terminal k at the same time. The sets configured by the CP should satisfy $|\mathcal{K}_l| = O_l$ and $1 \leq |\mathcal{L}_k| \leq O_k$. If a case of $|\mathcal{L}_k| > O_k$ occurs, the CP may remove the corresponding AN from $\mathcal{L}_k$ of the terminal having a low value of $\text{Tr}(R_{k,l})$, and thus add another terminal having the next high value of $\text{Tr}(R_{k,l})$ to the related $\mathcal{K}_l$. If a case of $|\mathcal{L}_k| = 0$ occurs, the CP may add ANs for which the corresponding terminal k has a high value of $\text{Tr}(R_{k,l})$ to $\mathcal{L}_k$, and thus add the corresponding terminal to the related $\mathcal{K}_l$. Here, interference between the terminals may be eliminated through hierarchical hybrid beamforming to be described later regardless of the position of the terminal. In fact, if the number of antennas and the number of RF chains of the AN is sufficiently large, interference of terminals spaced at least half the wavelength of the radio frequency can also be controlled. When the number of antennas and RF chains of the AN is limited, the CP may group terminals according to similarity of $R_{k,l}$, and allow the terminals belonging to the same group to be served by different ANs. Through the above-described function, the CP may select a plurality of AN 1 ($l \in \mathcal{L}_k$) serving the terminal k, and may share data for the terminal k only with the ANs belonging to $\mathcal{L}_k$.

The control on Interference between ANs densely arranged in the PHY functional-split cloud RAN according to an exemplary embodiment of the present disclosure may be performed in the CP with the limited fronthaul consumption as described above. The CP may collect the local statistical CSI $R_{k,l}$ notified from the distributed ANs to generate the global statistical CSI $R_{k,l}$, $\forall k,l$. In order to configure a transmission space for each AN to minimize interference with neighboring ANs, the CP may calculate an outer precoding matrix for each AN using the global statistical CSI $R_{k,l}$, $\forall k,l$. In fact, the above-described outer precoding matrix for each AN may be information for configuring an RF precoder of the corresponding AN, and the corresponding AN may modify it by reflecting its RF precoder hardware constraints.

As an example of deriving the AN-specific outer precoding matrix, the outer precoding matrix may be derived through low-complexity non-repetitive block diagonalization. First, for the terminal k belonging to the set $\mathcal{K}_l$ of the terminals served by the AN 1, the CP may obtain $U_{k,l}, k \in \mathcal{K}_l$ through eigen decomposition of $R_{k,l} = U_{k,l} \Lambda_{k,l} U_{k,l}^H$, $k \in \mathcal{K}_l$. Through this, the CP may configure a transmission signal space $U_l$ and an interference signal space $U_{l-}$ for the AN 1 (S1130).

The transmission signal space $U_l$ for the AN 1 may be configured as in Equation 1 below.

$$U_l = [U^*_{\mathcal{K}_l^{(1)},l}, \ldots, U^*_{\mathcal{K}_l^{(|\mathcal{K}_l|)},l}] \in \mathbb{C}^{N_1 \times \Sigma_{k \in \mathcal{K}_l} r^*_k} \quad \text{[Equation 1]}$$

Here, $\mathcal{K}_l^{(i)}$ is the identifier of the terminal that is the i-th element of the set $\mathcal{K}_l$, and $U^*_{k,l}$ is a matrix constituted by $r^*_k (\leq r_k)$ principal eigenvectors less than the rank $r_k$ of $U_{k,l}$. Then, the interference signal space $U_{l-}$ for the AN 1 may be configured as shown in Equation 2 below.

$$U_{l-} = [U_1, \ldots U_{l-1}, U_{l+1}, \ldots, U_L] \in \mathbb{C}^{N_1 \times \Sigma_{j \neq l} \Sigma_{k \in \mathcal{K}_j} r^*_k} \quad \text{[Equation 2]}$$

Then, the CP may derive an external precoding matrix defining an interference-controlled transmission signal space for each AN (S1140). Specifically, a left eigenspace consisting of the weakest n eigen modes obtained through singular decomposition of $U_{l-}$ may be denoted as $E_{l-} \in \mathbb{C}^{N_1 \times n}$. That is, $E_{l-}$ consists of the weakest n left eigenvectors of $U_{l-}$. Then, a signal channel $U_{k,l}$ of the AN 1 is projected onto the space $E_{l-}$ so that $U_{k,l+} = (E_{l-})^H U_{k,l}$ is derived, and $E_{k,l+} \in \mathbb{C}^{n \times 1}$ consisting of the strongest left eigenvectors of $U_{k,l+}$ may be derived. Finally, the outer precoding vector $F_{k,l}^{outer}$ for the terminal k of the AN 1 may be expressed as Equation 3 below.

$$F_{k,l}^{outer} = E_{l-} E_{k,l+} \in \mathbb{C}^{N_1 \times 1} \quad \text{[Equation 3]}$$

$F_{j,l}^{outer}$ may be calculated for another terminal j ($\neq k$) belonging to $\mathcal{K}_l$ through the above procedure. When a matrix in which each of the precoding vectors is set as a column is generated, the outer precoding matrix $F_l^{outer}$ for the AN 1 may be derived. Consideration here is the dimensional size of the transmission space and the fronthaul capacity of the AN 1. As described above, the CP configures the transmission spaces by the number $|\mathcal{K}_l| = O_l$ of RF chains of the AN 1. Thus, reducing the dimensional size may reduce the overlap with the neighboring interference spaces and also reduce the required fronthaul capacity. Accordingly, the CP according to an exemplary embodiment of the present disclosure may adjust the transmission space size of AN 1, that is, the number of column vectors of $F_l^{outer}$, so as not to exceed the capacity of the fronthaul connected to the AN 1 (S1150). In addition, when it is determined that interference is strong directly or indirectly through performance monitoring, the CP may further reduce the transmission space size. $\mathcal{K}_l$ may also be modified according to the above adjustment.

As described above, the CP calculates the outer precoding matrix $F_l^{outer}$ for the AN 1, so that the transmission subspace of AN 1 is aligned with the signal channel of AN 1, as preferably orthogonal to the interference signal space. The CP may transfer the outer precoding vector $F_l^{outer}$, $\forall l \in \{1, 2, \ldots, L\}$ calculated based on the global statistical CSI to the corresponding ANs together with information on $\mathcal{K}_l$ (S1160). Then, the CP may share data to be transmitted to the terminal k through the fronthaul to the ANs belonging to the set $\mathcal{L}_k$ of the ANs providing services to the terminal k (S1170).

Meanwhile, in FIG. 11, it is described that the step S1150 of adjusting the transmission space size of AN 1 is performed after the steps S1160 and S1170. However, as described above, when it is determined that the interference is strong directly or indirectly through performance monitoring even while performing the step S1170, the CP may further adjust the transmission space size and provide relevant information to the ANs. That is, even during the execution of the step S1170, the step S1150 and the step S1160 may be re-executed when necessary.

Meanwhile, when the statistical CSI is reported to the CP periodically, or reported to the CP in accordance with the change of the statistical CSI, it may be started again from the step S1110. That is, the outer precoding matrix may be changed by the new global statistical CSI.

Operation Method of Access Node (AN)

Figure 12:
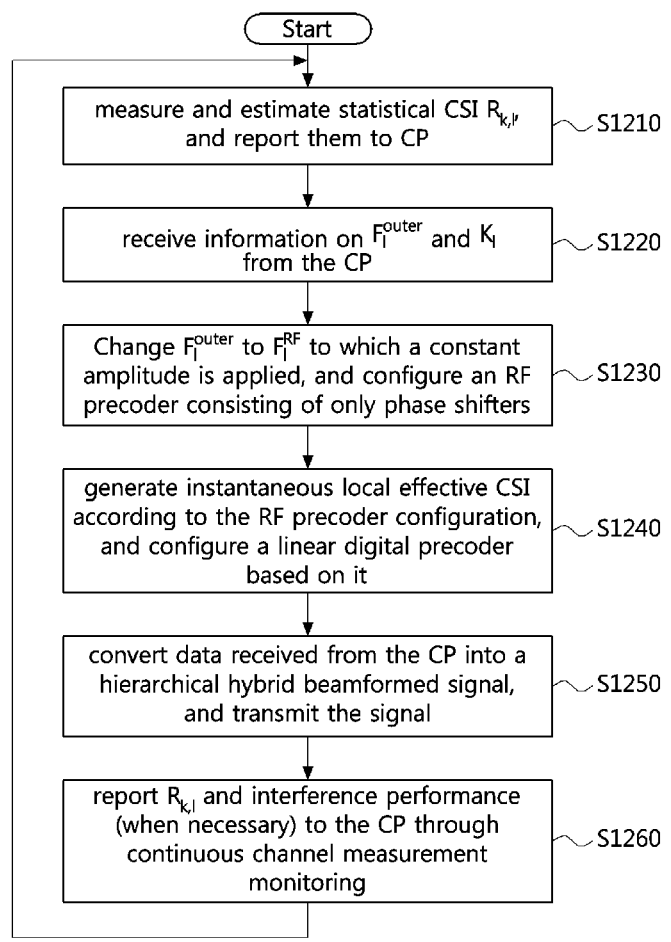
FIG. 12 is a flowchart illustrating an operation of AN belonging to a hierarchical hybrid beamforming based cooperative transmission system according to an exemplary embodiment of the present disclosure.

FIG. 12 is a flowchart illustrating an operation of AN belonging to a hierarchical hybrid beamforming based cooperative transmission system according to an exemplary embodiment of the present disclosure.

In FIG. 12, an operation procedure of AN that performs hierarchical hybrid beamforming based cooperative transmission in association with the CP operating according to the procedure illustrated in FIG. 11 is illustrated.

Referring to FIG. 12, the AN 1 may measure and estimate statistical CSIs $R_{k,l}$ of all terminals k ($\forall k \in \{1, 2, \ldots, K\}$) that the AN 1 can measure, and report them to the CP (S1210). The AN 1 may report the statistical CSI periodically or at the time when the statistical CSI changes in consideration of fronthaul consumption. In addition, target terminals for which the statistical CSI is reported may be limited based on information such as received signal strength. That is, the target terminals for which the statistical CSI is reported may be limited to terminals having a signal received with a strength greater than or equal to a predetermined value.

The AN 1 may receive information on the outer precoding matrix $F_l^{outer}$ and information on $\mathcal{K}_l$ from the CP (S1220). The step S1220 is an operation step of the AN 1 corresponding to the operation step S1160 of the CP described above with reference to FIG. 11.

The AN 1 may activate RF chains corresponding to the number of dimensions of $F_l^{outer}$ and configure an RF precoder including phase shifters connected to the corresponding RF chains (S1230). In order to apply $F_l^{outer}$ to the RF precoder composed of only phase shifters, the CP may set the size of each element of $F_l^{outer}$ to be $$\frac{1}{\sqrt{N_1}},$$

and set the phase of each phase shifter to $\measuredangle([F_l^{outer}]_{i,j})$, which is the phase of each element of $F_l^{outer}$. The constraint of the RF precoder consisting of only phase shifters may be referred to as 'constant modulus (CM)'. Therefore, the AN 1 should change $F_l^{outer}$ received from the CP to an RF precoding matrix $F_l^{RF}$ according to Equation 4 below.

$$[F_1^{RF}] = \frac{1}{\sqrt{N_1}} e^{j\measuredangle([F_1^{outer}]_{i,j})} \quad \text{[Equation 4]}$$

The AN 1 may set the phases of the individual phase shifters of each RF chain according to $F_l^{RF}$ derived based on Equation 4. The AN 1 may obtain local instantaneous effective CSI scaled down from the dimensions of antennas to the dimensions of RF chains through the RF precoder, and configure a linear digital precoder in a conjugate (maximum-ratio transmission) scheme, a zero forcing scheme, or a regularized zero forcing scheme on the basis of the local instantaneous effective CSI (S1240).

As described above, the AN 1 may configure the interference-controlled RF precoder generated by the CP from the global statistical CSI, and configure the digital precoder generated from the local instantaneous effected CSI obtained by the AN 1. Then, the AN 1 may receive data to be transmitted to the terminals belonging to $\mathcal{K}_l$ from the CP, convert the received data into a hierarchical hybrid beamformed signal using the digital precoder and the RF precoder, and transmit the same (S1250). Then, the AN1 may report to the CP the local statistical CSIs of all measurable terminals and interference performance of terminals in service through continuous channel measurement monitoring (S1260). Through this, the AN 1 may adjust the number of RF chains activated in itself and Fr according to the number of activated RF chains under control of the CP.

Meanwhile, when the AN 1 reports the local statistical CSI to the CP periodically or in accordance with the change of the local statistical CSI, it may be started again from the step S1210. That is, the outer precoding matrix may be changed by the new global statistical CSI.

Overall Operation Procedure of System

Hereinafter, a procedure in which the distributed ANs (e.g., AN i and AN j) and one CP in which hierarchical hybrid beamforming is implemented perform cooperative transmission for the terminal k will be described.

Figure 13:
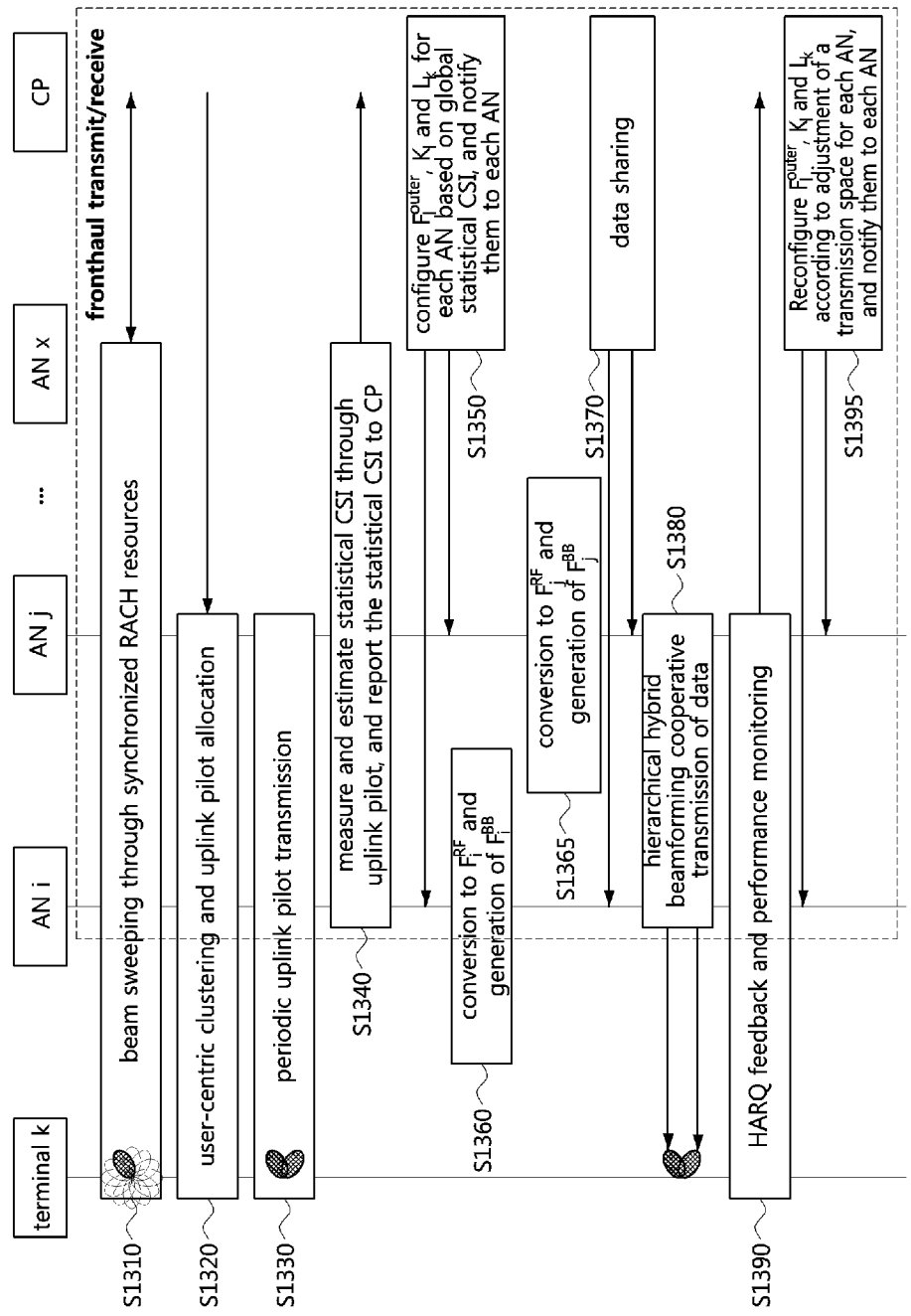
FIG. 13 is a flowchart illustrating an operation procedure of a hierarchical hybrid beamforming based cooperative transmission system according to an exemplary embodiment of the present disclosure.

FIG. 13 is a flowchart illustrating an operation procedure of a hierarchical hybrid beamforming based cooperative transmission system according to an exemplary embodiment of the present disclosure.

First, as described with reference to FIGS. 5 to 9, the terminal k may transmit a random access channel in a beam sweeping manner in a synchronized RACH interval configured by the CP (S1310). Each AN and the CP receiving the random access channel of the terminal k may determine whether the corresponding AN can provide a service to the terminal k based on a received signal strength of the random access channel, and may allocate a terminal-specific uplink pilot to the terminal k (S1320). In FIG. 13, a case where the terminal k establishes connections simultaneously with the AN i and the AN j is illustrated. That is, FIG. 13 illustrates a case where the AN i and the AN j are determined to belong to a cluster providing services to the terminal k.

Thereafter, the terminal k may periodically transmit the allocated uplink pilot (S1330), neighboring ANs including the AN i and the AN j may measure and estimate the local statistical CSI based on the uplink pilot of the terminal k, and report it to the CP (S1340). The CP may collect the local statistical CSI reported from the ANs to generate the global statistical CSI, derive the outer precoding matrix for each AN that can control interference between the ANs based on the global statistical CSI, and transmit it to each AN (S1350). On the other hand, the CP may transfer data to be transmitted to the terminal k to the AN i and the AN j (S1370). In FIG. 13, the step S1370 is illustrated as being performed after the step S1360, but the order of performing the step S1370 is irrelevant to the step S1360. That is, step S1370 may be performed before the step S1350 or may be performed simultaneously with the step S1350 or the step S1350.

Each of the AN i and the AN j may configure the RF precoder by converting the received outer precoding matrix into the RF precoding matrix having a constant amplitude based on Equation 4, and configure the digital precoder by using the local instantaneous CSI obtained by itself (S1360). This means that each of the AN i and the AN j calculates an inner RF and digital hybrid precoding matrix again on the interference-controlled transmission space defined by the outer precoding matrix received from the CP, and thus redefines the transmission space minimizing the interference between the terminals it serves. Each of the AN i and the AN j may convert the data received from the CP into a precoded signal using the above-described digital precoder and RF precoder, and transmit it to the terminal k (S1380). The terminal k may receive the interference-controlled data from the AN i and the AN j simultaneously.

In addition, the terminal k may feedback HARQ information to the AN i and the AN j in the data receiving process, and the AN i and the AN j may transmit interference related performance monitoring information to the CP (S1380). The CP may redefine the transmission space for each AN based on the interference related performance monitoring information transmitted from the AN i and the AN j (S1385).

Terminal and Apparatus Configuration

Figure 14:
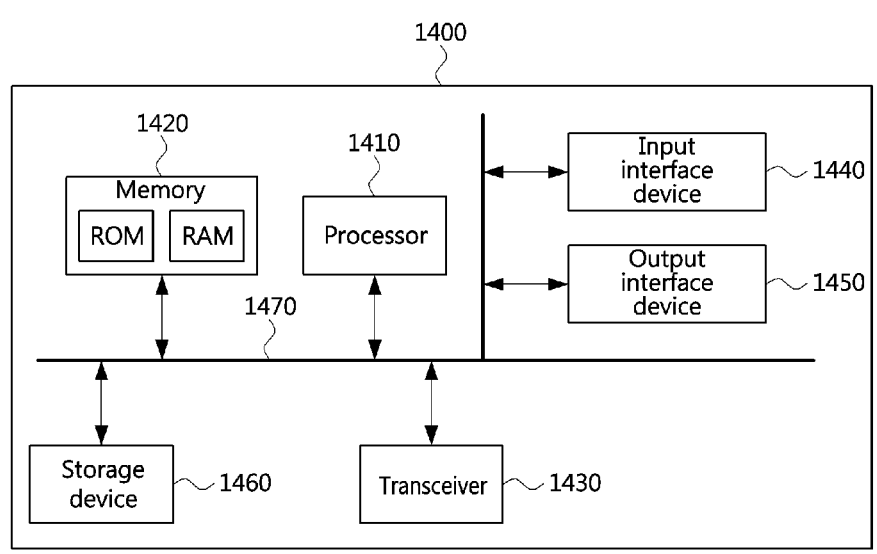
FIG. 14 is a block diagram illustrating a configuration of an apparatus for performing methods according to exemplary embodiments of the present disclosure.

FIG. 14 is a block diagram illustrating a configuration of an apparatus for performing methods according to exemplary embodiments of the present disclosure.

The apparatus illustrated in FIG. 14 may be a communication node (e.g., CP, AN, or terminal) for performing the methods according to the exemplary embodiments of the present disclosure.

Referring to FIG. 14, a communication node 1400 may include at least one processor 1410, a memory 1420, and a transceiver 1430 connected to a network to perform communication. In addition, the communication node 1400 may further include an input interface device 1440, an output interface device 1450, a storage device 1460, and the like. The components included in the communication node 1400 may be connected by a bus 1470 to communicate with each other. However, each component included in the communication node 1400 may be connected to the processor 1410 through a separate interface or a separate bus instead of the common bus 1470. For example, the processor 1410 may be connected to at least one of the memory 1420, the transceiver 1430, the input interface device 1440, the output interface device 1450, and the storage device 1460 through a dedicated interface.

The processor 1410 may execute at least one instruction stored in at least one of the memory 1420 and the storage device 1460. The processor 1410 may refer to a central processing unit (CPU), a graphics processing unit (GPU), or a dedicated processor on which the methods according to the exemplary embodiments of the present invention are performed. Each of the memory 1420 and the storage device 1460 may be configured as at least one of a volatile storage medium and a nonvolatile storage medium. For example, the memory 1420 may be configured with at least one of a read only memory (ROM) and a random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a centralized processor (CP) for hybrid beamforming based cooperative transmission, the operation method comprising:
    generating global statistical channel state information (CSI) by collecting local statistical CSI from each of access nodes (ANs) connected to the CP;
    configuring a set of first terminals to be served by a first AN of the ANs based on the global statistical CSI;
    configuring a transmission signal space and an interference signal space for the first AN, and deriving an outer precoding matrix defining an interference-controlled transmission signal space for the first AN based on the transmission signal space and the interference signal space; and
    transmitting the derived outer precoding matrix to the first AN,
    wherein a radio frequency (RF) precoder of the first AN is configured based on the derived outer precoding matrix, and a digital precoder of the first AN is configured using local instantaneous effective CSI between the first AN and the first terminals.

2. The operation method according to claim 1, wherein the local statistical CSI is a spatial channel covariance matrix between each of the ANs and terminals.

3. The operation method according to claim 1, wherein the CP provides configuration information on a synchronized random access channel (RACH) interval through the ANs; and the first terminal transmits a RACH signal to the first AN through the RACH interval, and is allocated an uplink pilot from the first AN.

4. The operation method according to claim 3, wherein the local statistical CSI between the first terminal and the first AN is measured based on the uplink pilot.

5. The operation method according to claim 1, further comprising:
    performing performance monitoring;
    adjusting a size of the interference-controlled transmission signal space for the first AN according to a result of the performance monitoring; and
    transmitting the outer precoding matrix modified according to the adjusted size of the interference-controlled transmission signal space to the first AN.

6. The operation method according to claim 1, further comprising transferring data to the first AN, wherein the data is transmitted to the first terminals through cooperative transmission of the first AN with at least one AN except the first AN among the ANs.

7. An operation method of a first access node (AN) for hybrid beamforming based cooperative transmission, the operation method comprising:
    measuring local statistical channel state information (CSI) for neighboring terminals and reporting the measured local statistical CSI to a centralized processor (CP);
    receiving, from the CP, an outer precoding matrix derived from global statistical CSI generated from the local statistical CSI and information on a set of first terminals to be served by the first AN; and
    configuring a radio frequency (RF) precoder of the first AN based on the outer precoding matrix,
    wherein the local statistical CSI is reported periodically or when the local statistical CSI is changed.

8. The operation method according to claim 7, wherein the local statistical CSI is a spatial channel covariance matrix between the first AN and the neighboring terminals.

9. The operation method according to claim 7, wherein the neighboring terminals for which the local statistical CSI is measured are limited to terminals transmitting signals which are received at the first AN with a strength greater than a predetermined value.

10. The operation method according to claim 7, wherein when the RF precoder includes only phase shifters, a size of each element of the outer precoding matrix is set constant, and a phase of each of the phase shifters is set to be a phase of each element of the outer precoding matrix.

11. The operation method according to claim 7, further comprising providing configuration information on a synchronized random access channel (RACH) interval provided from the CP to the neighboring terminals, wherein the neighboring terminals transmit RACH signals to the first AN through the RACH interval and are allocated uplink pilots from the first AN.

12. The operation method according to claim 11, wherein the local statistical CSI between the neighboring terminals and the first AN is measured based on the uplink pilots.

13. The operation method according to claim 7, wherein a digital precoder of the first AN is configured using local instantaneous effective CSI between the first AN and the first terminals.

14. The operation method according to claim 7, further comprising receiving data from the CP, wherein the data is transmitted to the first terminals through cooperative transmission of the first AN and a second AN.

15. A hybrid beamforming based cooperative transmission system, the hybrid beamforming based cooperative transmission system comprising a centralized processor (CP), access nodes (ANs) connected to the CP, and fronthaul links connecting the CP to the ANs, wherein the CP provides an outer precoding matrix for a first AN of the ANs, which is derived from global statistical channel state information (CSI) generated from local statistical CSI collected from the ANs, to the first AN via the fronthaul link; and the first AN configures a radio frequency (RF) precoder of the first AN based on the outer precoding matrix, and configures a digital precoder of the first AN based on local instantaneous effective CSI between the first AN and first terminals to be served by the first AN, wherein the CP and the ANs are nodes into which base station functions are split at a physical (PHY) layer or at a layer higher than the PHY layer.

16. The hybrid beamforming based cooperative transmission system according to claim 15, wherein the local statistical CSI is a spatial channel covariance matrix between each of the ANs and terminals.

17. The hybrid beamforming based cooperative transmission system according to claim 15, wherein the first AN converts data transferred from the CP into a precoded signal using the RF precoder and the digital precoder of the first AN, and transmits the precoded signal to the first terminals through cooperative transmission with at least one other AN except the first AN of the ANs.

\* \* \* \* \*